United States Patent
Rey

(10) Patent No.: US 12,363,662 B2
(45) Date of Patent: Jul. 15, 2025

(54) FRAME SYNCHRONIZATION DETECTION WITH FRACTIONAL APPROXIMATION

(71) Applicant: Cypress Semiconductor Corporation, San Jose, CA (US)

(72) Inventor: Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 454 days.

(21) Appl. No.: 17/970,527

(22) Filed: Oct. 20, 2022

(65) Prior Publication Data

US 2024/0137879 A1 Apr. 25, 2024
US 2024/0236884 A9 Jul. 11, 2024

(51) Int. Cl.
*H04W 56/00* (2009.01)

(52) U.S. Cl.
CPC ............................... *H04W 56/0015* (2013.01)

(58) Field of Classification Search
CPC ................................................. H04W 56/0015
USPC .......................... 370/350, 328, 329, 341, 345
See application file for complete search history.

(56) References Cited

U.S. PATENT DOCUMENTS

| | | | |
|---|---|---|---|
| 6,473,449 B1 * | 10/2002 | Cafarella | H04B 1/707 375/E1.032 |
| 7,929,927 B2 | 4/2011 | Norris et al. | |
| 8,688,140 B2 * | 4/2014 | Nemeth | G01S 3/043 455/507 |
| 9,794,056 B1 | 10/2017 | Tamma et al. | |
| 10,530,905 B1 | 1/2020 | Rey et al. | |
| 10,819,544 B2 | 10/2020 | Stanciu et al. | |
| 10,862,505 B1 | 12/2020 | Rey et al. | |
| 10,862,728 B1 | 12/2020 | Rey et al. | |
| 10,862,729 B1 | 12/2020 | Rey et al. | |
| 11,545,982 B2 | 1/2023 | Perin et al. | |
| 11,621,898 B2 | 4/2023 | Stanciu et al. | |
| 11,639,981 B2 * | 5/2023 | Wu | H04W 4/021 342/28 |
| 2023/0110131 A1 * | 4/2023 | Smith | H04L 61/4505 370/254 |

FOREIGN PATENT DOCUMENTS

| | | |
|---|---|---|
| EP | 3264701 B1 | 2/2019 |
| EP | 3706380 A1 | 9/2020 |
| EP | 3731478 A3 | 10/2020 |
| EP | 3737055 A1 | 11/2020 |
| EP | 4064568 A1 | 9/2022 |

* cited by examiner

*Primary Examiner* — Nghi H Ly

(57) ABSTRACT

A wireless device includes a receiver to receive a packet via one or more antennas. A frame synchronization detection circuit coupled to the receiver identifies a frame synchronization pattern within a portion of the packet. A correlation circuit coupled to the frame synchronization detection circuit computes one or more values of a correlation peak using a correlation method. A fractional timing approximation circuit coupled to the correlation circuit determines a pulse shape using the one or more values of the correlation peak; and determines a fractional timing approximation for the packet using the pulse shape.

20 Claims, 5 Drawing Sheets

FRAME SYNCHRONIZATION DETECTION WITH FRACTIONAL APPROXIMATION

TECHNICAL FIELD

The present disclosure pertains to wireless networks and, more specifically, to frame synchronization detection of various electronic devices communicating wirelessly, e.g., via a Bluetooth (BT) or Bluetooth® Low Energy (BLE) connection.

BACKGROUND

Personal area networks (PANs), such as Bluetooth (BT), Bluetooth® Low Energy (BLE), Zigbee®, infrared, and the like, use the 2.4 GHz radio frequency band to provide a wireless connection for various personal industrial, scientific, and medical applications. PANs generally use a packet-based protocol and have an architecture that includes central devices (CDs) and peripheral devices (PDs). A CD can communicate with multiple PDs.

Typically, data is transferred between a CD and a specific PD during a time allocated for the specific PD-CD communication link. At a designated time, a PD can tune in to receive messages and data from the CD and, in turn, communicate data to the CD. Additionally, a CD can sometimes use a broadcast mode, in which the same data is communicated to multiple PDs simultaneously. BLE networks have communication ranges similar to BT networks but have a considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

DETAILED DESCRIPTION

Figure 1A:
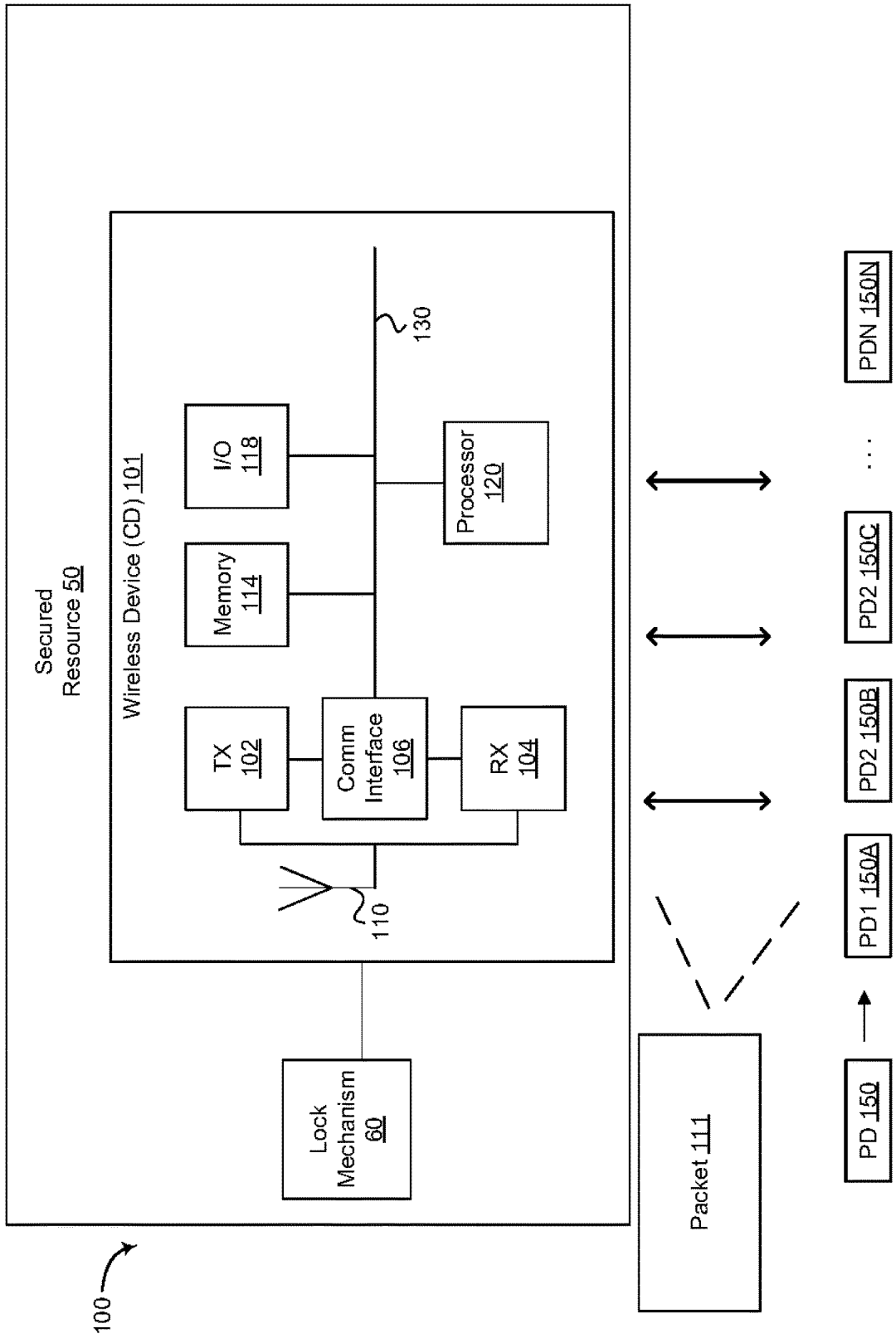
FIG. 1A is a block diagram of an example system for frame synchronization detection with fractional approximation between a wireless device acting as a CD and a wireless device acting as a PD, in accordance with some implementations.

The following description sets forth numerous specific details, such as examples of specific systems, devices, components, methods, and so forth, in order to provide a good understanding of various embodiments of frame synchronization detection between wireless devices associated with a PAN. The disclosed principles may generally be applied to (Gaussian) Frequency Shift Keying ((G)FSK) modulation. Frame synchronization (or frame synch) detection may refer to detecting a frame delimiter, also referred to as a start frame delimiter (SID), in a network packet that is identifying or signaling that data is to follow within a frame of the packet.

In certain PAN devices, frame synchronization detection can be used in order to aid in communication between wireless devices by identifying or signaling the data (i.e., payload data) that is to follow in a packet. Optionally, frame synchronization detection can also identify the sender of the packet. In certain PAN devices, frame synchronization can be used as part of BLE distance estimation. BLE distance estimation is achieved through a phase-based distance ranging method, or through packet exchanges in round trip timing (RTT) estimation, or a combination thereof to provide localization between wireless devices. In one example, data patterns are used in RTT estimation to estimate the time of arrival (ToA) of a packet. In another example, BLE distance estimation can use the frequency estimated during the RTT estimation to synchronize the BLE distance estimation device to other BLE distance estimation devices through the correction of clocking errors and to estimate the frequency offset between devices. Additionally, BLE distance estimation can use data patterns to estimate frequency for use in security features, such as intrusion detection models.

Frame synchronization detection can be carried out at a sample rate that is a simple multiple (e.g., 4, 6, 8, 12 megahertz (MHz)) of the data symbol rate (e.g., 1 or 2 megabits per second (Mbps)). The sample rate and the data symbol rate are typically a divided (e.g., sampling) rate of the crystal oscillator (XO) frequency (e.g., 24, 32, or 48 MHz). The subsequent processing of the data symbols may be straightforward in being performed at known XO-integer-divided sample rates, and synch data patterns (e.g., of digital "0s" and "1s") can be more easily correlated using bit decisions according to Boolean logic. Alternatively, signed soft symbols may be used to obtain more accurate results, in which case the correlation can be described as a number of multipliers, summations, and/or subtractions. In practice, a time of arrival (ToA) estimate of synch frames is as accurate as the closest edge of a receiver clock (a.k.a., coarse timing) or as accurate as a fraction of a period of the receiver clock (a.k.a., fractional timing). Thus, there can be a need to obtain a timing estimate that is as accurate as possible.

Aspects and implementations of the present disclosure address these and other limitations of the existing technology by enabling systems and methods of frame synchronization detection with fractional approximation. In one example implementation, a receiver of a wireless device receives a packet over a communication channel wirelessly (e.g., via one or more antennas). A frame synchronization detection circuit that is coupled to the receiver identifies a frame synchronization pattern within a portion of the packet. A correlation circuit coupled to the frame synchronization detection circuit computes, in response to identifying the frame synchronization pattern at the portion of the packet, one or more values near a correlation peak using a correlation method. A fractional timing approximation circuit coupled to the correlation circuit determines a pulse shape using the one or more values near the correlation peak. The fractional timing approximation circuit further determines a fractional timing approximation for the packet using the pulse shape. Numerous other implementations and multiple variations of these implementations are discussed below.

Advantages of the present disclosure may include using frame synchronization detection in order to determine a fractional timing approximation that is more accurate, thus providing a much more accurate RTT estimation. Having a more accurate RTT estimation can, in turn, be used to estimate the time of arrival (ToA) of a packet. Thus, the fractional timing approximation accuracy can be improved in BLE distance estimation devices for localization and ranging services, as well as for security applications, allowing for more accurate localization and ranging services in devices such as BLE distance estimation devices.

FIG. 1A is a block diagram of an example system for frame synchronization detection with frequency estimation between a wireless device 101 acting as a CD and a wireless device 150 acting as a PD, in accordance with some implementations. The system 100 can include a secured resource 50, e.g., that is secured using a lock mechanism 60, where the wireless device 150 is adapted to gain access to the secured resource 50 via the lock mechanism 60. The secured resource 50 can be, for example, a vehicle, a building, a residence, a garage, a shed, a vault, or the like. The secured resource 50 can also be a computer system, industrial equipment, or other items requiring secured access via the lock mechanism 60, which can be a digital locking mechanism, for example. In some embodiments, the lock mechanism is integrated together with the wireless device 101.

In some embodiments, the wireless device 150 is any one of multiple peripheral wireless devices PD1 150A, 150B, 150C . . . 150N, etc., as the wireless device 101 may be adapted to communicate with any or all of the peripheral wireless devices PD1 150A, 150B, 150C . . . 150N, etc. In some embodiments, the wireless device 101 is a mobile device such as a mobile phone, a smartphone, a pager, an electronic transceiver, a tablet, or the like. In some embodiments, the wireless device 150 can be adapted to gain access to the secured resource 50 by transmitting data encapsulated in a packet 111. The packet 111 can be transmitted from the wireless device 150 to the wireless device 101, as will be discussed in more detail. While the wireless device 101 is illustrated in detail, the wireless device 150 can also include the same or similar components as the wireless device 101, but are not repeated for simplicity.

In some embodiments, the wireless device 101 includes, but is not limited to, a transmitter 102 or TX (e.g., a PAN transmitter), a receiver 104 or RX (e.g., a PAN receiver), a communications interface 106, an antenna 110, a memory 114, one or more input/output (I/O) devices 118 (such as a display screen, a touch screen, a keypad, and the like), and a processor 120. These components may all be coupled to a communications bus 130. In some embodiments, the frequency offset, as described herein, is an offset (e.g., difference) between a frequency at the TX 102 and a frequency at the RX 104.

In some embodiments, a separate antenna is employed for each of the transmitter 102 and receiver 104, and so the antenna 110 is illustrated for simplicity. In some embodiments, the memory 114 includes storage to store instructions executable by processor 120 and/or data generated by the communications interface 106. In some embodiments, the one or more antennas (such as the antenna 110) described herein within various devices are used for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as a front-end of the wireless device 101. The communication interface 106 may coordinate, as directed by the processor 120, to request/receive packets (e.g., the packet 111) from the peripheral wireless device 150. The communications interface 106 may further process data symbols received by the receiver 104 in a way that the processor 120 can perform further processing, including determining a more accurate fractional timing approximation by identifying a frame synchronization pattern within the samples of data values obtained from a frame of the packet 111, computing one or more values near a correlation peak using a correlation method, determining a pulse shape using the one or more values near the correlation peak, and determining a fractional timing approximation for the packet using the pulse shape, as discussed herein.

Figure 1B:
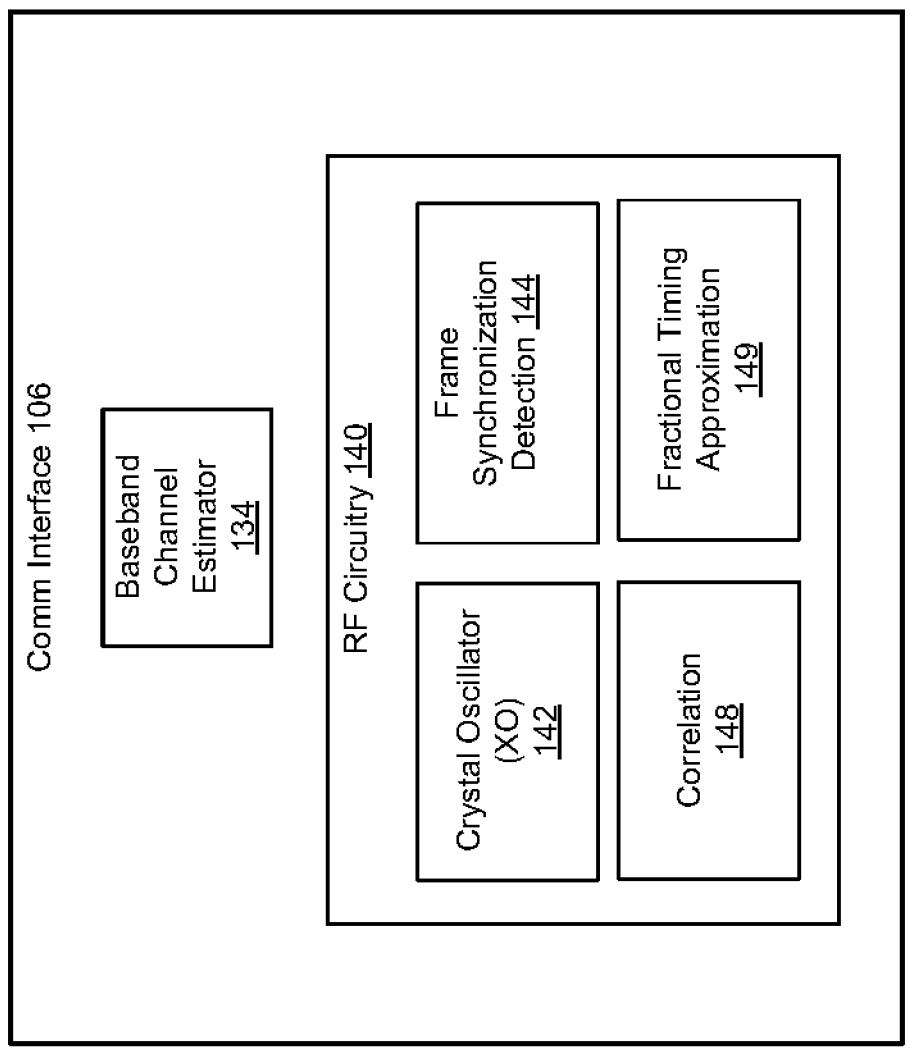
FIG. 1B is a simplified block diagram of the communication interface of the CD-based wireless device of FIG. 1A, in accordance with some implementations.

FIG. 1B is a simplified block diagram of the communication interface 106 of the CD-based wireless device 101 of FIG. 1A, in accordance with some implementations. In at least some embodiments, the communication interface 106 includes a baseband channel estimator 134 used to estimate, and thus, detect, a channel and enable the receiver 104 to receive packets over the channel. Estimating a channel may, for example, refer to estimating channel state information (CSI) and a received signal strength indicator (RSSI) for each channel. The receiver 104 may thus adjust the rate of sampling channel properties by the baseband channel estimator 134. Thus, the receiver 104 or the baseband channel estimator 134 may include a local oscillator (LO) that samples at particular bit rates for particular channels, which is often at a non-integer bit rate.

In some embodiments, the communication interface 106 includes RF circuitry 140, although the RF circuitry 140 discussed herein may also be coupled with the communication interface 106 and thus be located elsewhere within the front-end of the wireless device 101. In some embodiments, the RF circuitry 140 includes (or is coupled with) a crystal oscillator (XO) 142 and includes a frame synchronization detection circuit 144, a correlation circuit 148, and a fractional timing approximation circuit 149.

The XO 142 may provide a clock to govern sampling and processing in an XO-based frequency domain. In some embodiments, the RF circuitry 140 is implemented as a programmable processor, such as an application-specific integrated circuit (ASIC), field-programmable gate array (FPGA), a processing unit (such as a CPU or a GPU), or other microprocessor device that may include a combination of circuit-based hardware, logic, firmware, and/or software.

In some embodiments, the frame synchronization detection circuit 144 is configured to identify a frame synchronization pattern within a portion of a packet received via the receiver 104. The frame synchronization pattern can be a set of bits that include a pre-known data pattern that indicates or identifies when data is to follow within the frame of the packet. The correlation circuit 148 may be configured to compute one or more values near a correlation peak using the data samples from the received packet. The one or more values near the correlation peak can be computed using a correlation method, as described herein with respect to FIG. 2. The fractional timing approximation circuit 149 may be configured to determine a pulse shape using the one or more values of the correlation peak as identified by the correlation circuit 148. The fractional timing approximation circuit 149 may further determine a fractional timing approximation for the packet using the determined pulse shape. Further details with respect to the fractional timing approximation circuit 149 are described with reference to FIG. 3 herein.

Figure 1C:
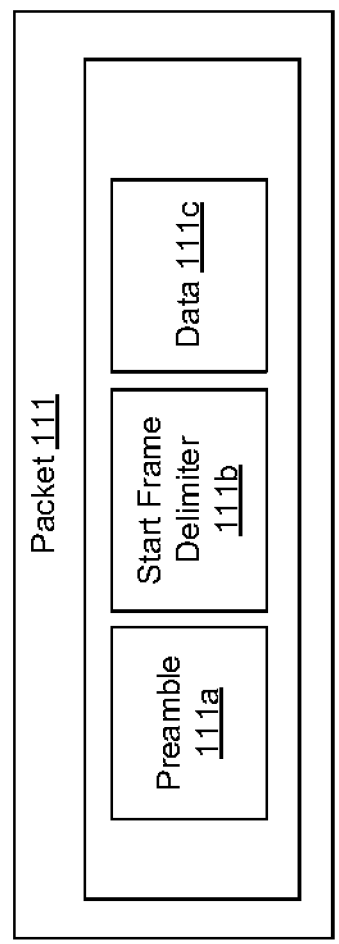
FIG. 1C is a simplified block diagram illustrating a packet received from a wireless device, in accordance with some implementations.

FIG. 1C is a simplified block diagram illustrating a packet 111 received from a wireless device (e.g., the PD 150 in FIG. 1A), in accordance with some implementations. As illustrated in FIG. 1C, the packet 111 can include, but is not limited to, a preamble 111a, a start frame delimiter 111b, and data 111c. The preamble 111a is typically a fixed number of bytes (e.g., seven bytes) that indicate or identify that data is to follow within a frame of a packet received by a receiver (e.g., the receiver 104 of FIG. 1A). The preamble 111a allows wireless devices (e.g., the wireless device 101 of FIG. 1A) to synchronize their receiver clocks with the transmitter clocks of wireless devices (e.g., the PD 150 in FIG. 1A). The start frame delimiter 111B is typically another fixed number of bytes (e.g., one byte) that indicates the end of the preamble 111a and the start of the frame with payload data (e.g., the data 111c).

Figure 2:
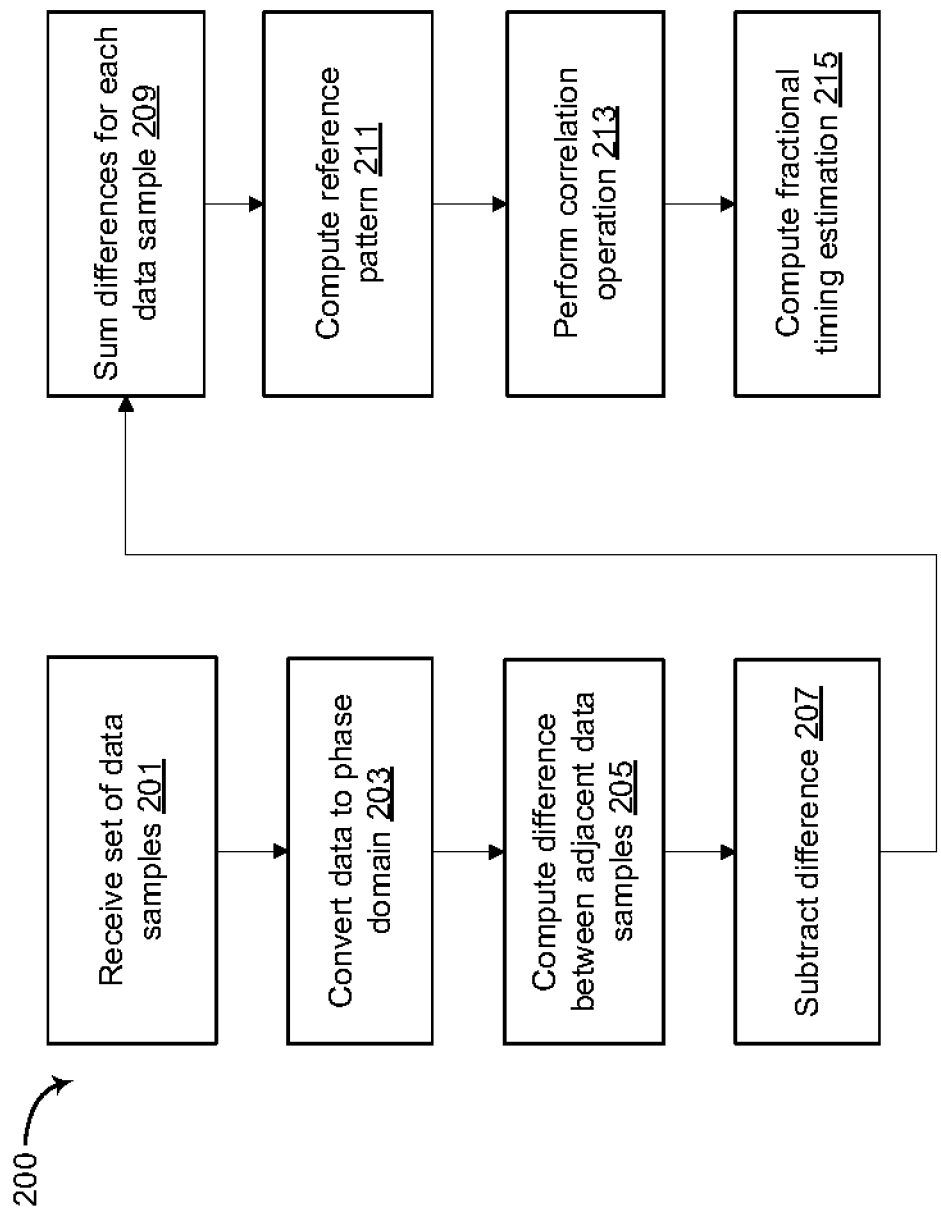
FIG. 2 is a flow diagram of an example method for approximating a fractional timing delay using frame synchronization detection, in accordance with some implementations.

FIG. 2 is a flow diagram of an example method 200 for approximating a fractional timing delay using frame synchronization detection, in accordance with some implementations. The method 200 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the communication interface 106 and/or the processor 120 of the wireless device 101 (e.g., as illustrated in FIGS. 1A-1B).

At operation 201, n data samples of a packet (e.g., the packet 111 of FIG. 1C) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the $n^{th}$ data sample, where the differential is over one symbol S. For example, in some embodiments, at operation 203, the data samples of the packet are converted into the in-phase domain (e.g., $\varphi(n)$). For example, the data samples can be converted into the in-phase domain using a mathematical equation that may be:

$$\varphi(n) = \operatorname{atan} 2(I, Q),$$

where I is an in-phase domain value, and Q is a quadrature domain value.

At operation 205, the difference between adjacent data samples can be computed. In some embodiments, computing the difference between adjacent samples is performed by calculating the differential of adjacent phase domain data sample values. For example, the difference can be computed using a mathematical equation that may be:

$$d\varphi(n) = \varphi(n) - \varphi(n-1).$$

At operation 207, for each difference between adjacent samples computed at operation 205, the difference a symbol away from each sample can be subtracted. For example, the difference a symbol away can be subtracted using a mathematical equation that may be:

$$dS\varphi(n) = \frac{d\varphi(n) - d\varphi(n-k)}{k}.$$

where k is the data oversampling ratio used in the receiver.

At operation 209, the differences for each data sample can be accumulated (e.g., summed up) in order to obtain the frequency estimation samples dS(n). In some embodiments, the differences are further scaled, using a value such as $\pi$ (i.e., pi) and a modulation index h (e.g., a fixed value such as 0.5). For example, the differences can be accumulated and scaled to obtain dS(n) using a mathematical equation that may be:

$$dS(n) = \pi h \sum\nolimits_{k=1}^{n} dS\varphi(k).$$

At operation 211, a reference frame synchronization pattern can be computed. In some embodiments, the reference frame synchronization pattern is a pattern that is to be used in a correlation operation. When the reference frame synchronization pattern matches a portion of the received data, the correlation operation generates a peak (in magnitude). The reference frame synchronization pattern can be computed, for example, using a mathematical equation that may be:

$$\operatorname{Ref}(n) = \pi h(2\vartheta(n) - 1).$$

In the mathematical equation above, $\vartheta(n)$ can be pre-determined synchronization symbols that are found in BLE distance estimation devices.

At operation 213, a correlation operation can be performed in order to obtain a peak in the correlation and one or more values before and after the peak (e.g., to generate fractional timing correctional values to the peak). In some embodiments, the correlation operation is performed using a mathematical equation using the computed reference frame synchronization pattern and the computed frequency estimation samples dS(n) to compute a peak value. For example, the mathematical equation may be:

$$\operatorname{Corr}(n) = \sum\nolimits_{i=1}^{i=3} S(n - i * k) \operatorname{Ref}(i),$$

where k is the data oversampling ratio used in the receiver.

To compute the one or more values before and after the peak, the processing logic can compute a fractional timing correctional value of the computed peak value (e.g., +/−0.25, +/−0.5, etc.).

At operation 215, using the peak value in addition to the one or more values before and after the peak, a fractional timing estimation can be computed. Computing the fractional timing estimation can include performing a linear interpolation of the phase of the peak value and the phase of the one or more values before and/or after the peak. In some embodiments, a conventional linear interpolation mathematical method is used. In some embodiments, the linear interpolation can be performed using a parabolic fit function or other fit function. For example, with respect to parabolic fits, a stationary point of the parabola can be computed, e.g., the point where the derivative of the parabola is zero. For example, the mathematical equation to compute the stationary point of the parabola may be the following equation or some approximation thereof:

$$\operatorname{fract} = \frac{P_m - P_p}{P_m - 2P_0 + P_p},$$

where $P_m$ is the value of the correlation before the peak; Pp is the value of the correlation after the correlation peak; and $P_0$ is the value of the correlation at the peak (e.g., the computed peak value).

Approximating the peak value using a parabolic fit function, as described above, can be useful when there are small deviations in the fractional timing. However, approximating fractional timing using a parabolic fit function when there are radio interferences, such as noise, can lead to an inaccurate fractional timing approximation. The accuracy of the fractional timing approximation can be improved by finding an underlying fit to the data near the peak of the correlation function that need not be parabolic in order to compute the fractional timing approximation, as described herein with respect to FIG. 3.

It should be understood that the above mathematical equations are intended as examples and that various other schemes are possible, e.g., using different specific equations, accounting for different (or additional) corrections and/or values of the peak, etc., while still being within the scope of this disclosure.

Figure 3:
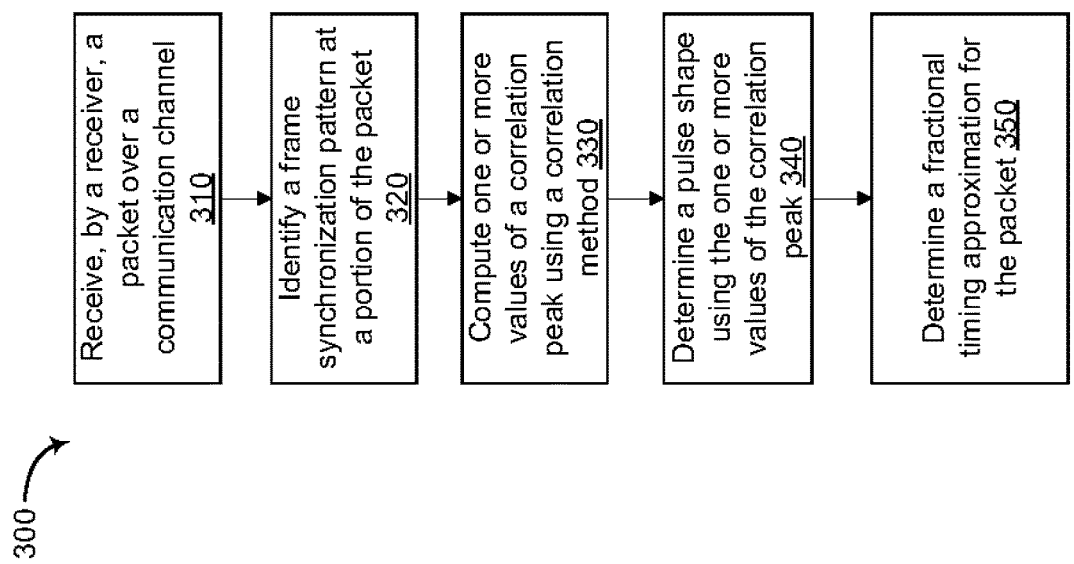
FIG. 3 is a flow diagram of an example method for frame synchronization detection with fractional approximation, in accordance with some implementations.

FIG. 3 is a flow diagram of an example method 300 for frame synchronization detection with fractional approximation, in accordance with some implementations. The method 300 may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the communication interface 106 and/or the processor 120 of the wireless device 101 (e.g., as illustrated in FIGS. 1A-1B).

At operation 310, the processing logic receives a packet. The packet can be received via a receiver (e.g., the receiver 104 of FIG. 1A). In some embodiments, the packet is the packet 111 of FIG. 1A and/or FIG. 1C. The packet can include a preamble, a start frame delimiter, and payload data, as described herein.

At operation 320, the processing logic identifies a frame synchronization pattern. The frame synchronization pattern can be identified within a portion of the packet 111. In some embodiments, the frame synchronization pattern is a sequence of bits from the preamble 111a and/or start frame delimiter 111b portions of the packet. Identifying the frame synchronization pattern can include identifying a pre-known data pattern within the portion of the packet. The pre-known data pattern can be a set of bits in the sequence of bits from the preamble 111a, the start frame delimiter 111b portions of the packet, and/or a set of known symbols in a payload portion of the packet.

At operation 330, the processing logic computes one or more values near a correlation peak. For example, the one or more values near the correlation peak can include the peak value, a value before the peak value, and a value after the peak value. In some embodiments, the processing logic computes the one or more values near the correlation peak using a correlation method. For example, the processing logic can compute the one or more values near the correlation peak using the correlation method described with respect to FIG. 2. In some examples, the processing logic can compute the one or more values near the correlation peak using other methods of correlation not specifically described herein or known at the present time.

At operation 340, the processing logic determines a pulse shape using the one or more values of the correlation peak computed at operation 330. In some embodiments, the processing logic can determine the pulse shape by using a non-parabolic fitting function, e.g., applying the one or more values of the correlation peak to the non-parabolic fitting function. In some embodiments, the non-parabolic fitting function can be a Gaussian fitting function, cubic fitting function, quartic fitting function, etc. For example, the shape of the correlation peak (near the peak) can be approximated using a mathematical equation for a Gaussian fitting function such as:

$$G(x) = ce^{-\frac{(x-d)^2}{b^2}}\left(-\frac{(x-d)^2}{b^2}\right), \quad [1]$$

where c is the gain, d is the delay, and b is dependent on a data pattern used. In some embodiments, the values of a, b & c can be dependent on the one or more values near the correlation peak computed at operation 330. For example, consider Equation [1], at the sampling point of the correlation peak $P_0$, the value of x may be set to 0. At the sample before the correlation peak with the value $P_m$, the value of x can be set to −1. Also, at the sample after the correlation peak correlation with the value $P_p$, x can be set to 1. Solving Equation [1] given output values for "GOO" of [$P_m$, $P_0$, $P_p$] and input "x" values of [−1, 0, 1], gives:

(1)
$$P_m = ce\left(-\frac{(1-d)^2}{b^2}\right), \quad [2a]$$

(2)
$$P_0 = ce\left(-\frac{(-d)^2}{b^2}\right), \quad [2b]$$

(3)
$$P_p = ce\left(-\frac{(1-d)^2}{b^2}\right). \quad [2c]$$

In some embodiments, $b^2$ can be computed by the processing logic using, for example, Equations [2a, 2b, 2c] above to give:

$$b^2 = \frac{2}{\log\left(\frac{P_0^2}{P_p P_m}\right)}.$$

In some embodiments, $b^2$ can be computed by the processing logic using a look-up table. In some embodiments, the look-up table can be a preconfigured table, where the look-up table stores one or more computed values associated with the data pattern and is dependent on features of the data pattern. The processing logic can retrieve a computed value from the look-up table. The processing logic can perform a square function on the computed value in order to compute $b^2$.

In some embodiments, d can be computed by the processing logic using Equations [2a, 2b, 2c] above to give:

$$d = -b^2 \log\left(\frac{P_p}{P_m}\right).$$

In some embodiments, d can be computed by the processing logic using another look-up table. In some embodiments, the look-up table can be a preconfigured table, where an entry of the look-up table can store a computed value of $$\log\left(\frac{P_p}{P_m}\right).$$

At operation 350, the processing logic determines a fractional timing approximation for the packet received at operation 310. In some embodiments, the processing logic determines the fractional timing approximation using one or more parameters (e.g., the pulse shape determined at operation 340). In some embodiments, the processing logic can determine the fractional timing approximation by using a mathematical equation that may be:

$$b^2(\log(P_m)-\log(P_p)).$$

FIGS. 2-3 are not intended to limit the methods described therein to certain combinations, permutations, or assignment of actors, i.e., whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer-accessible, or computer-readable medium, which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and/or other example language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A system comprising:
    a wireless device; and
    one or more antennas, the wireless device comprising:
        a receiver to receive a packet via the one or more antennas;
        a frame synchronization detection circuit coupled to the receiver to identify a frame synchronization pattern within a portion of the packet;
        a correlation circuit coupled to the frame synchronization detection circuit to compute, in response to the identifying of the frame synchronization pattern, one or more values of a correlation peak using a correlation method; and
        a fractional timing approximation circuit coupled to the correlation circuit to:
            determine a pulse shape using the one or more values of the correlation peak; and
            determine a fractional timing approximation for the packet using the pulse shape.

2. The system of claim 1, wherein to identify the frame synchronization pattern, the frame synchronization detection circuit is further to identify a pre-known data pattern within the portion of the packet indicative of a start of a frame in the packet, wherein the pre-known data pattern comprises a plurality of bits.

3. The system of claim 1, wherein the pulse shape is determined using a non-parabolic fitting function.

4. The system of claim 1, wherein the pulse shape is determined using a Gaussian fitting function.

5. The system of claim 1, wherein to determine the pulse shape using the one or more values of the correlation peak, the fractional timing approximation circuit is further to apply the one or more values of the correlation peak to a non-parabolic fitting function.

6. The system of claim 1, wherein to determine the pulse shape using the one or more values of the correlation peak, the fractional timing approximation circuit is further to apply the one or more values of the correlation peak to a Gaussian fitting function.

7. A method of operating a wireless device, the method comprising:
receiving a packet over a communication channel;
identifying a frame synchronization pattern within a portion of the packet;
in response to the identifying of the frame synchronization pattern, computing one or more values of a correlation peak using a correlation method;
determining a pulse shape using the one or more values of the correlation peak; and
determining a fractional timing approximation for the packet using the pulse shape.

8. The method of claim 7, wherein identifying the frame synchronization pattern comprises identifying a pre-known data pattern within the portion of the packet indicative of a start of a frame in the packet, wherein the pre-known data pattern comprises a plurality of bits.

9. The method of claim 7, wherein the pulse shape is determined using a non-parabolic fitting function.

10. The method of claim 7, wherein the pulse shape is determined using a Gaussian fitting function.

11. The method of claim 7, wherein determining the pulse shape using the one or more values of the correlation peak comprises applying the one or more values of the correlation peak to a non-parabolic fitting function.

12. The method of claim 7, wherein determining the pulse shape using the one or more values of the correlation peak comprises applying the one or more values of the correlation peak to a Gaussian fitting function.

13. The method of claim 7, wherein determining the fractional timing approximation for the packet using the pulse shape further comprises retrieving a value associated with a data pattern from a look-up table.

14. A wireless device comprising:
a receiver to receive a packet over a communication channel;
a frame synchronization detection circuit coupled to the receiver to identify a frame synchronization pattern within a portion of the packet;
a correlation circuit coupled to the frame synchronization detection circuit to compute one or more values of a correlation peak using a correlation method; and
a fractional timing approximation circuit coupled to the correlation circuit to determine a pulse shape using the one or more values of the correlation peak and determine a fractional timing approximation for the packet using the pulse shape.

15. The wireless device of claim 14, wherein to identify the frame synchronization pattern, the frame synchronization detection circuit is further to identify a pre-known data pattern within the portion of the packet indicative of a start of a frame in the packet, wherein the pre-known data pattern comprises a plurality of bits.

16. The wireless device of claim 14, wherein the pulse shape is determined using a non-parabolic fitting function.

17. The wireless device of claim 14, wherein the pulse shape is determined using a Gaussian fitting function.

18. The wireless device of claim 14, wherein to determine the pulse shape using the one or more values of the correlation peak, the fractional timing approximation circuit is further to apply the one or more values of the correlation peak to a non-parabolic fitting function.

19. The wireless device of claim 14, wherein to determine the pulse shape using the one or more values of the correlation peak, the fractional timing approximation circuit is further to apply the one or more values of the correlation peak to a Gaussian fitting function.

20. The wireless device of claim 14, wherein to determine the fractional timing approximation for the packet using the pulse shape, the fractional timing approximation circuit is further to retrieve a value associated with a data pattern from a look-up table.

* * * * *